April 1, 1958     W. M. HARRIS     2,828,554
COLOR-SELECTING DEVICES
Filed Nov. 22, 1955     2 Sheets-Sheet 1
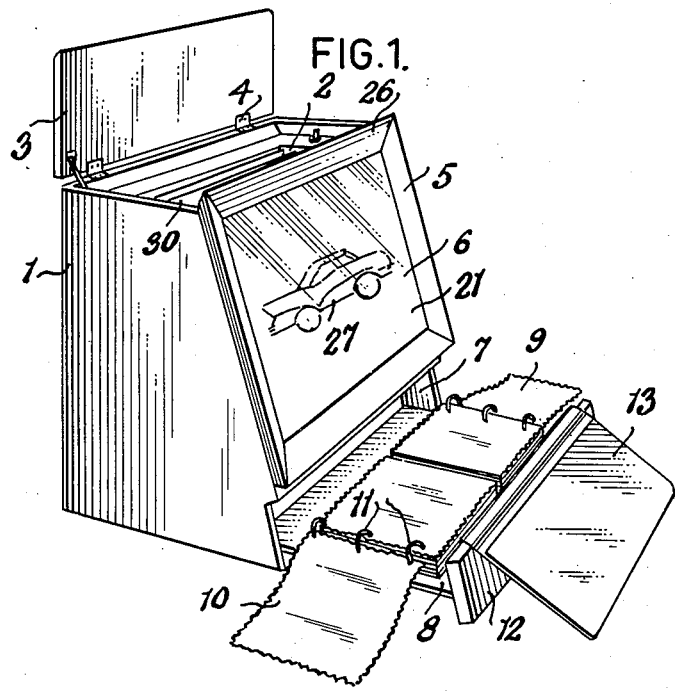
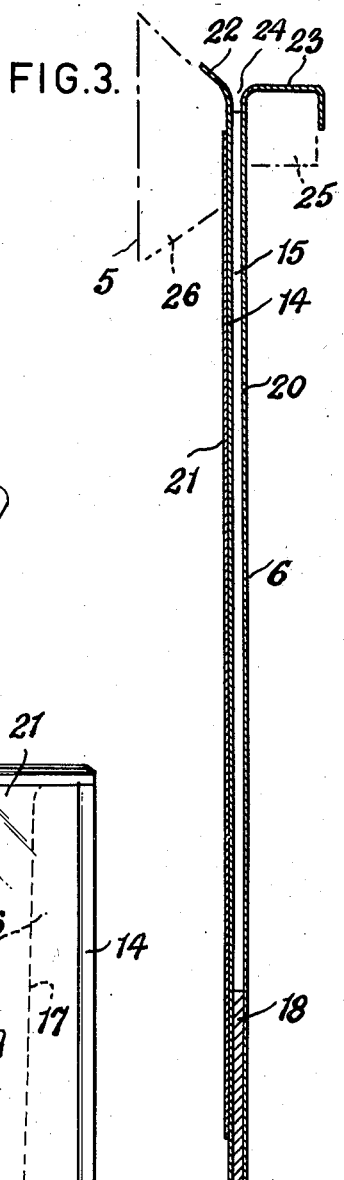
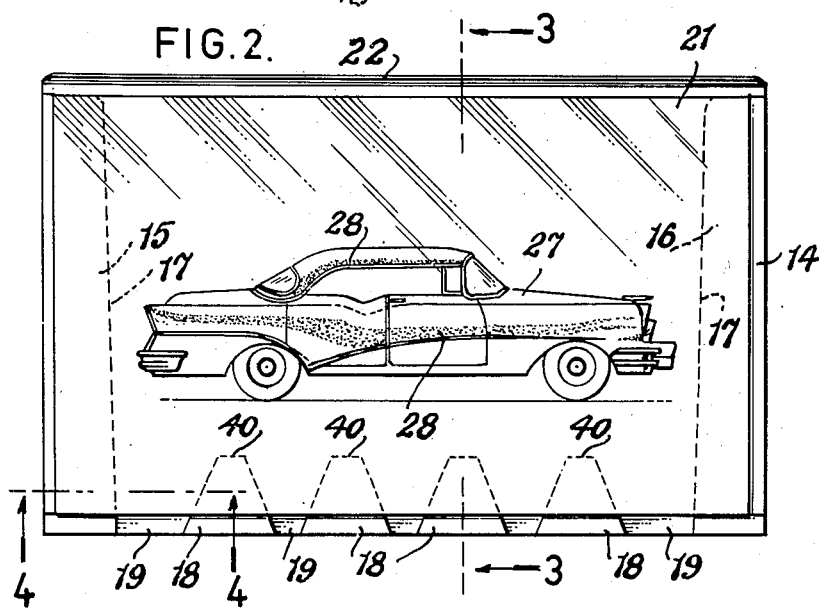
INVENTOR.
William Melish Harris
BY
Atty April 1, 1958 W. M. HARRIS 2,828,554
COLOR-SELECTING DEVICES
Filed Nov. 22, 1955 2 Sheets-Sheet 2
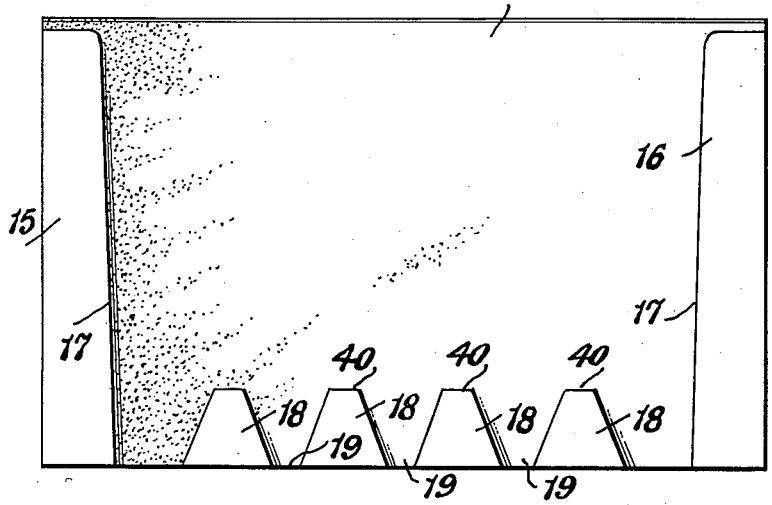
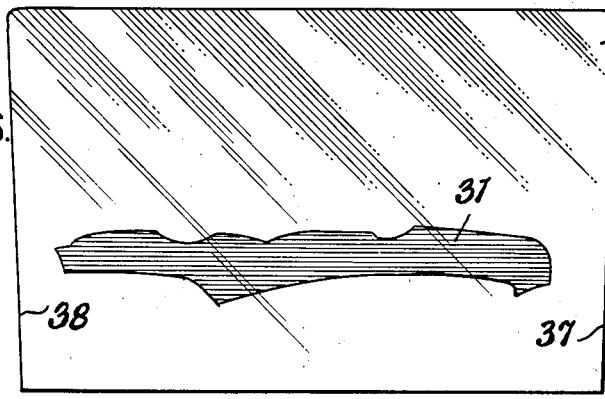
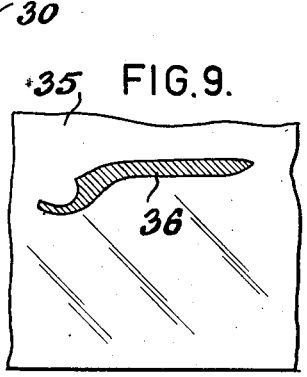
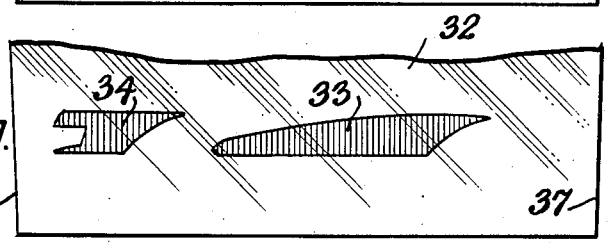
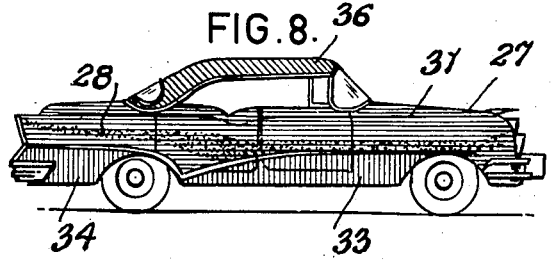
INVENTOR.
William Melish Harris
BY
Harry Razinsky
Atty

United States Patent Office 2,828,554
Patented Apr. 1, 1958

2,828,554

COLOR-SELECTING DEVICES

William Melish Harris, Greenwich, Conn.

Application November 22, 1955, Serial No. 548,394

3 Claims. (Cl. 35—53)

This invention relates to color-selecting devices, and particularly to those adapted for the selection of color-combinations used on various known articles, such as automobile bodies.

At the present time, many automobile bodies are multi-colored and are provided in various color combinations. It is often difficult for the prospective buyer to visualize the various color combinations without seeing them actually applied to the body of a car and since the automobile dealer obviously does not have available cars in the various colors procurable, he must rely upon catalog illustrations or other pictures in order to show the customer the various color combinations. Such pictures do not accurately show the exact coloring used on the cars.

It is therefore an object of the present invention to provide a color selector which will enable various color combinations to be truthfully and accurately reproduced on an illuminated transparency, so that a lifelike representation of a car, painted with colors obtainable, will be presented to a prospective purchaser. It is an object of the invention to provide a simple apparatus by means of which the colors and color combinations presented to the viewer can be easily changed, so that all of the color combinations available from the automobile manufacturer can be quickly and faithfully presented without requiring a customer to leave the office or show room to actually inspect cars painted with the colors.

It is an object of the invention to provide a simple means by which the various colors can be changed from one to another; to provide means by which the various colored slides can be conveniently stored; to provide a cabinet in which the transparencies will not only be attractively presented to the viewer but which can house upholstery and trim fabric swatches for presentation to the viewer, simultaneously with the showing of the car body colors.

With these and other objects to be hereinafter set forth in view, I have devised the arrangement of parts to be described and more particularly pointed out in the claims appended hereto.

In the accompanying drawings, wherein an illustrative embodiment of the invention is disclosed, Fig. 1 is a perspective view of a color selector constructed in accordance with the invention;

Fig. 2 is a front elevational view of the envelope which carries the base transparency and into which the color-bearing slides are inserted at the rear of the transparency;

Fig. 3 is a sectional view, taken substantially on the line 3—3 of Fig. 2, looking in the direction of the arrows;

Fig. 4 is a sectional view, taken substantially on the line 4—4 of Fig. 2, looking in the direction of the arrows;

Fig. 5 is a front elevational view of the envelope, with the base transparency and the front panel removed to disclose the separators and the rear diffusing panel;

Fig. 6 is a face view of one of the color-bearing slides;

Fig. 7 is a face view of a portion of a second color-bearing slide;

Fig. 8 shows the representation of an automobile as produced in color by placing the base transparency and three color-bearing slides in facial relation, and Fig. 9 is a face view of the third color-bearing transparency.

Referring to the drawing, and particularly to Fig. 1 thereof, 1 indicates the body of a cabinet forming part of the color-selector. The cabinet is provided at the front with an inclined window opening defined by a frame 5, and through the window is exposed the front panel of an envelope 6 which carries on said front transparent panel 14 the base transparency indicated at 21. The construction of this envelope will be presently described in greater detail.

Contained within the cabinet 1 is suitable illuminating means not shown, but of known form, so that the cabinet constitutes a light box to illuminate from the rear the base transparency 21 and the several color-bearing slides 30, 32 and 35 which are placed within the envelope 6 behind the base transparency 21 in a manner to be described. When the color-bearing slides are not in use in the manner just mentioned, they are stored in the well 2 of the cabinet, which can contain a substantial number of these slides in various colors for selection and use as required. The top of the cabinet 1 is normally closed by the lid 3 that is hingedly attached to the rear wall of the cabinet as indicated at 4.

Below the frame 5 is provided a compartment 7 which houses a slidable drawer 8. Supported in the drawer are swatches 9 and 10 of fabrics usable as upholstery and trim in cars of various colors. The swatches are pivotally mounted on the rings 11 so that they may be exposed as required for inspection by the customer. The proximity of the swatch samples to the envelope 6 enables the viewer to simultaneously inspect the color combination of the car displayed in the frame 5 while he is examining and considering the upholstery and trim material indicated by the swatches 9 and 10 for that particular color combination.

Hingedly attached to the front panel 12 of the drawer 8 is a color chart 13 suitably imprinted with data relative to color combinations of the cars and the upholstery and trim combinations intended for particularly-colored cars. When in use the panel 13 is swung outwardly to the position shown in Fig. 1, and when not in use it is swung inwardly to overlie the swatches 9 and 10 so that it can be moved with the drawer to closed position.

The envelope 6 carrying the base transparency 21, behind which the color bearing slides are adapted to be positioned, is clearly shown in Figs. 2 to 5 inclusive. The same includes a back panel 20 of flexible translucent material and of such nature as to act as a diffuser for the light located behind it and contained in the cabinet 1. The front panel 14 of the envelope is of a flexible transparent material, such as one of the transparent plastics, and it is substantially similar in shape to the rear panel. The two panels 14 and 20 are maintained in spaced-apart relation by means of spacing members 15 and 16 adjacent to the side edges of the envelope, as well as by the spaced-apart bottom spacing elements shown at 18. These spacing elements 15, 16 and 18 are cemented between front panel 14 and back panel 20, thus holding these two panels in spaced relation to provide a pocket between them. Such pocket is defined by the inclined edges 17 of the spacing members 15 and 16 and by the upper ends 40 of the lower spacers 18. It is to be noted that the lower spacers 18 are spaced apart or separated by apertures 19, which apertures constitute dust-escape openings since they permit dust particles to fall out of the bottom of the envelope, preventing the dust from collecting in the envelope and dulling the reproduced image.

At its upper edge, the front panel 14 is formed with an outwardly directed flange 22, while the upper end of the rear panel 20 is bent rearwardly as at 23, and thence downwardly. This arrangement provides a funnel-like mouth 24 through which the slides are smoothly inserted. This arrangement of the flanges 22 and 23 also aids in positioning the envelope 6 to the rear of the frame 5, for the flange 22 on the front panel 14 fits against the upper face of the top frame element 26 as shown in Fig. 3, while the flange 23 fits over the top of a cross member 25 in the cabinet located directly to the rear of the frame 5.

Adhesively attached to the face of the front panel 14 of the envelope is the base transparency 21, and the same is imprinted with, or otherwise bears the outline representation 27 of an automobile. In stating that the representation 27 is of "outline" form, such term is intended to also contemplate the inclusion of various details of the structure of the car and particularly those which are not colored or painted. Included also in the representation 27 may be shadowings such as shown at 28. Included also on this base transparency, and in suitable color, may be an attractive background, scenery or other appropriate embellishments to add to the attractiveness of the displayed car. In describing the illustration 27 as an automobile, it will be understood that this is illustrative as the article shown may be any known object to be produced in colors.

To provide coloring for the body of the car, color-bearing slides, such as shown at 30, 32 and 35 are used. These slides are all of the same shape and substantially as shown in Fig. 6, so that each slide, when inserted in the envelope 6 behind the front panel 14 thereof, will fit in the space defined by the inclined edges 17 and the upper ends 40 of the spacers 18. It will be noted that the side edges 37 and 38 of the slides 30, 32 and 35 converge from the top of the slide downwardly, so that when each slide is inserted into the envelope behind the front panel 14, it will be guided by the edges 17 to a position of rest with its lower edge contacting the tops 40 of the spacers 18. This precise fitment of each of the slides into the envelope results in an accurate registration of the color areas displayed on each slide with the complementary outlined areas on the automobile representation 27 borne by the base transparency 27.

Provided on the slide 30 is a color representation 31, printed in coloring and which is of a shape that it fits within and fills the upper portion of the car body representation 27. Thus, it will be apparent that when slide 30 is inserted in the envelope 6 behind the front panel 14 and to the rear of the base transparency 21 attached thereto, the upper portion of the car body will be filled in with the color borne by the colored element 31 on panel 30.

To fill in the lower portion of the body with a different color, slide 32 is slipped into the envelope behind the previously inserted slide 30. It will be seen that slide 32 bears color representations 33 and 34 which may be of a color different from that shown at 31, but of course, preferably one compatible thereto. When slide 32 is fitted in place in the envelope as above described, the colored representations 33 and 34 will respectively register with the lower portion of the body and rear mud guard, as indicated in Fig. 8. There now remains the top of the car to be filled in with a suitable color and this is done by means of the slide 35 which bears a color representation 36 conforming in shape to the top of the car. Thus, when this slide 35 is inserted in the envelope behind the two slides 30 and 32 previously inserted therein, it will fill in the top of the car with the color of the color representation 36.

All of the slides employed are of flexible transparent material, and the colored images borne thereby and intended to fill in various portions of the car with desired or selected colors, while being somewhat translucent, have sufficient transparency to permit of the details of the outline representation, including the shadowings 28 thereon, to show through them, so that when the light is projected through the several facially-arranged transparencies an extremely realistic representation of the car in full coloring is attained.

While I have herein suggested that the slides 30, 32 and 35 be inserted in the envelope 6 in a certain sequence, it will be understood that such sequence is not necessary, since the slides can be placed in facial contact in any order with a securement of the same desirable results. The number of slides used may also be varied according to the number of areas on the base illustration required to be filled with colors.

In using the device, it is merely necessary to illuminate the light within the cabinet, and thereafter select the proper slides and insert them in the envelope. The slides are self-aligning due to the convergence of the edges 17 and the converging edges 37 and 38 on the several slides. Thus, merely inserting the slides into the envelope 6 results in the registration of the several color elements borne by the slides with the required areas of the automobile representation 27. At the same time, while the customer is examining the displayed picture, he can inspect the swatches 9 and 10 to see the upholstery and trim to be fitted in the car of his color selection.

While I have herein suggested that the improved color selector is particularly adapted for use in the selection of coloring for automobile bodies, it will be apparent that it may be readily used for many other purposes, such as, for example, in connection with articles of clothing, interior decorations, rugs, draperies and many other articles.

Having therefore described a single embodiment of the invention, it is obvious that the same is not to be restricted thereto, but is broad enough to cover all structures coming within the scope of the annexed claims.

What I claim is:

1. In a color selector, an envelope having a transparent front panel, a transparency mounted over the front panel, said transparency bearing the outline representation of an automobile, the envelope having a rear panel of diffusing material, separators located between the panels to hold the same in spaced relation and form a pocket within the envelope, a plurality of said separators having inclined edges, other of said separators being spaced apart and located at the lower end of the envelope and providing dust-escape apertures between them, transparent slides bearing color areas, said slides fitting within the pocket in the envelope and being guided thereinto by the inclined edges of the separators, a frame, and means on the envelope for supporting the same from the frame.

2. In a color selector as provided for in claim 1, wherein the means which supports the envelope consists in outwardly-extended flanges provided at the tops of the front and rear panels of the envelope, said flanges forming a funnel-like entrance into the envelope.

3. In a color selector, an envelope of flexible material, said envelope having a front transparent panel, a base transparency secured to the front of said panel, said transparency bearing the outline representation of a known object, the envelope having a rear panel of diffusing material, spacing means located between the front and rear panels, said spacing means consisting of a plurality of spaced separators at the lower end of the envelope, said separators providing dust-escape apertures between them, transparent slides accommodated in the envelope between the front and rear panels, each of said slides bearing color areas adapted to register with outlined sections of the outline representation when the slides are inserted within the envelope, and guide means for positioning the slides within the envelope in a manner to cause their color areas to register with the desired outlined sections of the outline representation, said guide means including converging edges on the separators co-operating with similar edges on the slides.

References Cited in the file of this patent

UNITED STATES PATENTS

| | | |
|---|---|---|
| 1,415,712 | Taylor | May 9, 1922 |
| 1,871,078 | Nash | Aug. 9, 1932 |
| 2,105,008 | Riley | Jan. 11, 1938 |
| 2,120,499 | Mackay | June 14, 1938 |
| 2,409,285 | Jacobson | Oct. 15, 1946 |
| 2,494,072 | Vetterli | Jan. 10, 1950 |
| 2,499,450 | Bergman | Mar. 7, 1950 |
| 2,634,132 | Freedman | Apr. 7, 1953 |